(12) United States Patent
Tazbaz et al.

(10) Patent No.: US 10,859,844 B2
(45) Date of Patent: Dec. 8, 2020

(54) SYSTEMS FOR LATERAL MOVEMENT OF OPTICAL MODULES

(71) Applicant: Microsoft Technology Licensing, LLC, Redmond, WA (US)

(72) Inventors: Errol Mark Tazbaz, Bellevue, WA (US); Philip Andrew Frank, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/937,600

(22) Filed: Mar. 27, 2018

(65) Prior Publication Data

US 2019/0302463 A1 Oct. 3, 2019

(51) Int. Cl.
G02B 27/01 (2006.01)

(52) U.S. Cl.
CPC ..... *G02B 27/0179* (2013.01); *G02B 27/0176* (2013.01); *G02B 2027/0159* (2013.01); *G02B 2027/0161* (2013.01); *G02B 2027/0181* (2013.01)

(58) Field of Classification Search
CPC .............. G02B 7/12; G02B 2027/0154; G02B 2027/0161; G02B 2027/0181; G02C 7/088
See application file for complete search history.

(56) References Cited

U.S. PATENT DOCUMENTS

| | | | | |
|---|---|---|---|---|
| 4,605,288 A | * | 8/1986 | Shimofuruta | G02B 7/06 359/414 |
| 5,347,400 A | * | 9/1994 | Hunter | G02B 3/08 345/7 |
| 5,640,271 A | * | 6/1997 | Nishitani | G02B 7/12 359/407 |
| 6,254,233 B1 | * | 7/2001 | Prestandrea | G02C 7/088 351/41 |
| 9,025,252 B2 | | 5/2015 | Lewis et al. | |
| 2006/0072206 A1 | * | 4/2006 | Tsuyuki | G02B 27/0172 359/631 |

(Continued)

FOREIGN PATENT DOCUMENTS

| | | |
|---|---|---|
| CN | 104317054 A | 1/2015 |
| CN | 104849864 A | 8/2015 |
| CN | 106019602 A | 10/2016 |

OTHER PUBLICATIONS

"Head Mounted Display Interpupilary Adjustment Mechanism", Retrieved from: <<https://www.youtube.com/watch?v=hHXtlmC-CgMg>>, Jan. 11, 2011, 3 Pages.

(Continued)

*Primary Examiner* — Michelle M Iacoletti
*Assistant Examiner* — Christopher A Lamb, II
(74) *Attorney, Agent, or Firm* — Alleman Hall Creasman & Tuttle LLP

(57) ABSTRACT

An optical system comprises a first optical module and a second optical module. A tensioned element includes an upper segment attached to the first optical module and a lower segment attached to the second optical module. Movement of the tensioned element thus generates opposing movement of the first and second optical modules, the first optical module moving in a direction parallel to a direction of movement of the upper segment, and the second optical module moving in a direction parallel to a direction of movement of the lower segment.

20 Claims, 8 Drawing Sheets

(56) References Cited

U.S. PATENT DOCUMENTS

| | | |
|---|---|---|
| 2006/0250322 A1 | 11/2006 | Hall et al. |
| 2015/0103306 A1 | 4/2015 | Kaji et al. |
| 2015/0138645 A1 | 5/2015 | Yoo et al. |
| 2018/0101014 A1* | 4/2018 | Bohn ................. G02B 27/0176 |

OTHER PUBLICATIONS

"Mechanical IPD Adjustment Idea for the Consumer Rift", Retrieved from: <<https://forums.oculus.com/community/discussion/2433/mechanical-ipd-adjustment-idea-for-the-consumer-rift>>, Jul. 2013, 15 Pages.

\* cited by examiner

SYSTEMS FOR LATERAL MOVEMENT OF OPTICAL MODULES

BACKGROUND

Optical systems may have independent control over the operation of left and right-eye optics. For example, a head-mounted display may present imagery that is separately adjusted for each eye in order to generate stereo imagery, 3D imagery, etc.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed herein relating to adjustable optical systems. In one embodiment, an optical system comprises a first optical module and a second optical module. A tensioned element includes an upper segment attached to the first optical module and a lower segment attached to the second optical module. Movement of the tensioned element thus generates opposing movement of the first and second optical modules, the first optical module moving in a direction parallel to a direction of movement of the upper segment, and the second optical module moving in a direction parallel to a direction of movement of the lower segment. In this way, the lateral width of the optical modules may be adjusted to accommodate a user's inter-pupil distance.

DETAILED DESCRIPTION

Head-mounted displays and other optical systems may employ separate left and right eye optical modules in order to present display imagery to a user. In order to accurately reproduce imagery, the optical modules are ideally placed in alignment with the user's eyes. However, different users have different eye spacing and different inter-pupil distances (IPD). As such, it is challenging to produce optical systems that are one-size-fits-all.

While some devices are produced in different sizes for different users, there remains a need for fine control to adjust the left and right optical modules to the IPD for any given user. In order for multiple users to share such a device, the adjustment mechanism should be externally accessible, ergonomic, and user-friendly.

Various mechanisms have been proposed to solve this problem, such as rack-and-pinion systems, scissors-like devices, worm gears, etc. However, these mechanisms are all constrained as to where the adjustment mechanism may reside and/or how it is operated. For example, to operate a rack and pinion mechanism, the pinion must be directly controlled. As such, a button or dial coupled to the pinion either needs to be directly located on the pinion, or an additional coupling system must act as a translator between the pinion and the input. This may diminish ergonomic control of the mechanism.

Further, optical systems like head-mounted displays include a large number of components that must be placed within a chassis. In a sleek or otherwise desirably small form factor, there may not be enough room within the chassis for bulky adjustment mechanisms, particularly in the Z-dimension.

In view of the issues described above, implementations are disclosed herein for adjusting a lateral distance between optical modules using a belt-drive mechanism. As an example, a timing belt may be wrapped around two or more pulleys such that the top and bottom surfaces of the belt are used to provide timed symmetric linear motion for the adjustment of left and right optical modules. For example, the right optical module may be coupled to the bottom surface of a belt and the left optical module may be coupled to the top surface of the belt.

Using a belt drive mechanism means that the components can be housed anywhere within the device chassis, so long as the belt is parallel to the direction of optical module adjustment. The adjustment interface can be placed anywhere that is ergonomically plausible (e.g., by positioning extra pulley wheel(s), by routing belts back together). Belts can be positioned to go around device components, and thus take advantage of any space available. In this way, a relatively simple mechanism may be utilized to provide lateral width adjustment for the optics of a head-mounted display, and thus to accommodate different IPD measurements of a diverse user population.

Figure 1:
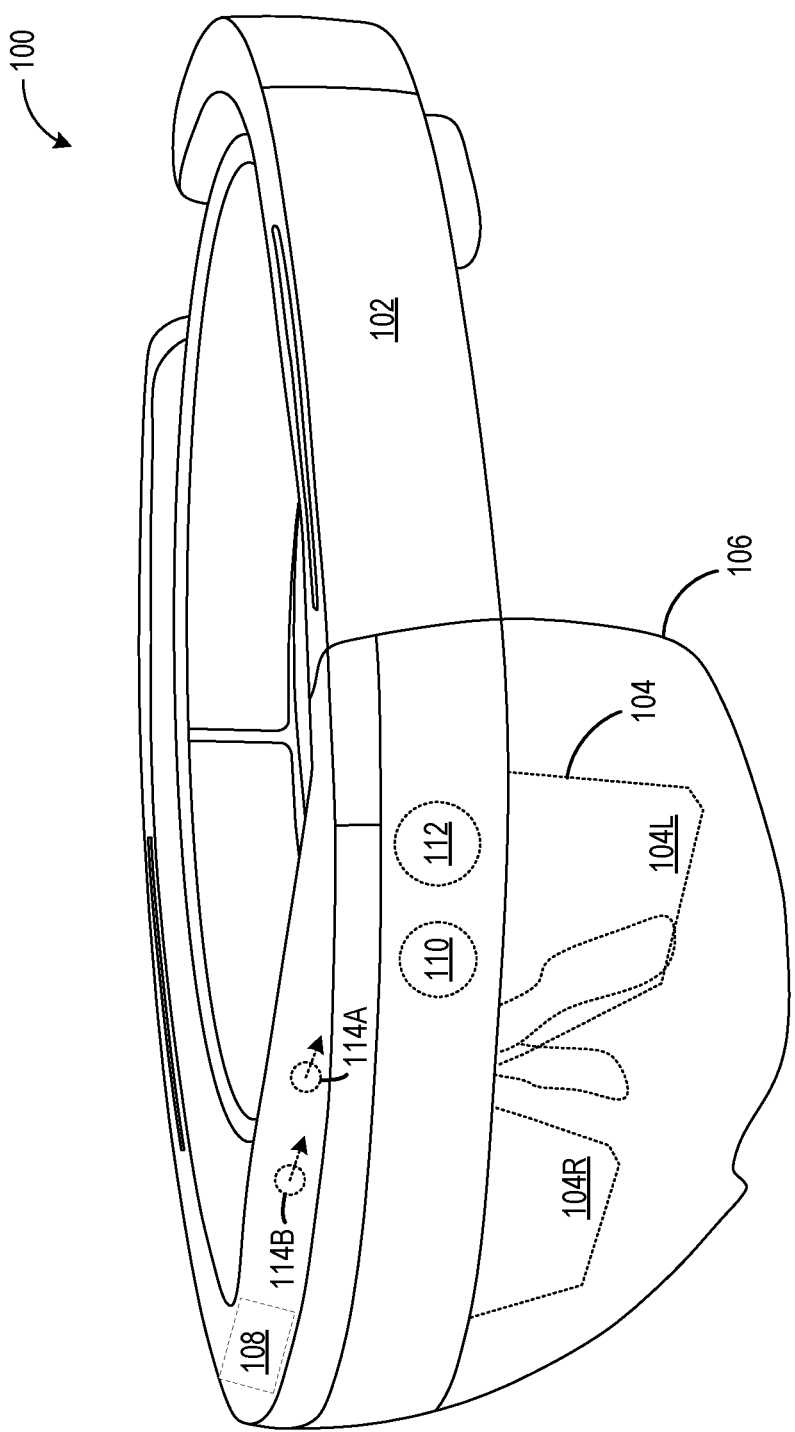
FIG. 1 shows an example optical system.

FIG. 1 shows an example optical system in the form of a head-mounted display device 100. Head-mounted display device 100 includes a frame 102 in the form of a band wearable around a head of user that supports see-through display componentry positioned near the user's eyes. Head-mounted display device 100 may utilize augmented reality technologies to enable simultaneous viewing of virtual display imagery and a real-world background. As such, head-mounted display device 100 is configured to generate virtual images via see-through display 104. See-through display 104 as depicted includes separate right and left eye optical modules 104R and 104L, which may be wholly or partially transparent. In other examples, a see-through display may have a single display viewable with both eyes. See-through display 104 may take any suitable form, such as a waveguide or prism configured to receive a generated image and direct the image towards a wearer's eye. See-through display 104 may include any suitable light source for generating images, such as one or more laser diodes. Such light sources may be arranged as point source(s), or as an array.

Head-mounted display device 100 further includes an additional see-through optical component 106, shown in FIG. 1 in the form of a see-through veil positioned between see-through display 104 and the background environment as viewed by a wearer. A controller 108 is operatively coupled to see-through display 104 and to other display componentry. Controller 108 includes one or more logic devices and one or more storage devices storing instructions executable by the logic device(s) to enact functionalities of the display device. Head-mounted display device 100 may further include various other components, for example a twodimensional image camera 110 (e.g. a visible light camera and/or infrared camera) and a depth camera 112.

Head-mounted display device 100 may additionally include one or more inward facing image sensors 114A and 114B. The one or more inward facing image sensors 114A and 114B may be configured to acquire gaze tracking information from a wearer's eyes (e.g., sensor 114A may acquire image data for one of the wearer's eye and sensor 114B may acquire image data for the other of the wearer's eye).

Controller 108 may be configured to determine gaze directions of each of a wearer's eyes in any suitable manner based on the information received from the image sensors 114A and 114B. The one or more inward facing image sensors 114A and 114B and controller 108 may collectively represent a gaze detection machine configured to determine a wearer's gaze target on see-through display 104. In other implementations, a different type of gaze detector/sensor may be employed to measure one or more gaze parameters of the user's eyes. Examples of gaze parameters measured by one or more gaze sensors that may be used by controller 108 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes. The one or more inward facing image sensors 114A and 114B and controller 108 may be configured to determine one or more additional characteristics of the user's eyes, such as pupil size, pupil location, retinal topography, scleral redness, etc.

Head-mounted display device 100 may further include other components that are not shown, including but not limited to speakers, microphones, accelerometers, gyroscopes, magnetometers, temperature sensors, touch sensors, biometric sensors, other image sensors, energy-storage components (e.g. battery), a communication facility, a GPS receiver, etc. Controller 108 may include a logic machine and a storage machine, discussed in more detail below with respect to FIG. 9, in communication with the see-through display 104 and the various sensors of the head-mounted display device 100.

Figure 2:
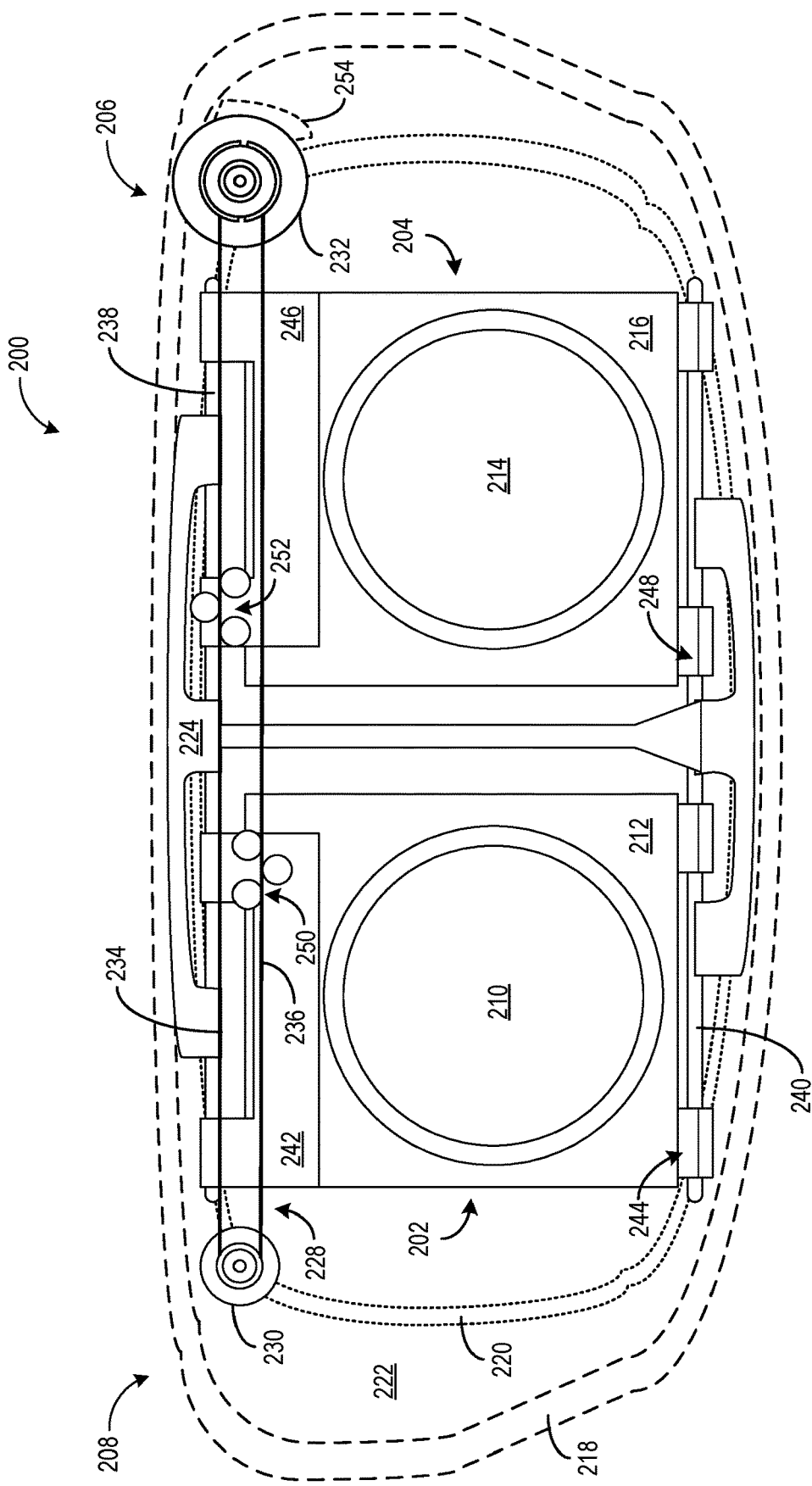
FIGS. 2-6 schematically show systems for adjusting the lateral width between optical modules in an optical system.

FIG. 2 depicts an example optics system 200 shown in the form of a head-mounted display. Optics system 200 is shown in a cutaway view from the perspective of a user looking through the display. Optics system 200 includes a first optical module 202 and a second optical module 204. For example, first optical module 202 may be a left eye optical module and second optical module 204 may be a right eye optical module. Optics system 200 further includes an optical module adjustment system 206 that may be utilized to adjust the lateral width of first optical module 202 and second optical module 204. First optical module 202, second optical module 204, and optical module adjustment system 206 may be housed within frame 208. Although described with regard to a head-mounted display, it should be understood that optical module adjustment system 206 may be incorporated into other optics systems, both wearable and non-wearable, without departing from the scope of this disclosure. In addition to the augmented reality system described with regard to FIG. 1, optics system 200 may additionally or alternatively be include in mixed reality and/or virtual reality systems.

First optical module 202 includes first lens 210 and first lens mount 212. Similarly, second optical module 204 includes second lens 214 and second lens mount 216. Each of first optical module 202 and second optical module 204 may include numerous additional components, such as an image generation system, relay optics, printed circuit board (PCB), etc. that may be positioned on the opposite side of the lens mounts 214 and 216.

Frame 208 is shown with a first frame edge 218 and a second frame edge 220. Sidewall 222 is positioned between first frame edge 218 and second frame edge 220. An interior frame 224 may be coupled to an upper surface and a lower surface of sidewall 222.

Optical module adjustment system 206 includes a tensioned element 228 coupled between first pulley 230 and second pulley 232. First pulley 230 is mounted on the outside of the first optical module, while second pulley 232 is mounted on the outside of the second optical module. Tensioned element 228 wraps around both pulleys, and thus spans across the length of the optical modules.

Movement of either pulley causes translation of tensioned element 228, such that an upper surface 234 and a lower surface 236 of tensioned element 228 move in opposing, but parallel directions. Tensioned element 228 may be a flexible or semi-flexible element, such as a belt, band, rubber band, chain, string, cord, cable, etc. In some examples, tensioned element 228 may be a toothed element, such as a timing belt. In such examples, first pulley 230 and second pulley 232 may include corresponding teeth. In other examples, tensioned element 228 may be a smooth belt that enables a purely friction-based drive system. While a friction belt may slip, symmetry may be reset when optical module adjustment system 206 is placed in a fully open or fully closed position. Such a friction-based system may be configured to be fault tolerant, so as not to be subject to permanent damage if loads above a threshold were applied by a user. Toothed elements are not correctable in the case of a skipped tooth, but such a skip may not necessarily disrupt the adjustment system.

First optical module 202 and second optical module 204 may be coupled to tensioned element 228 such that movement of tensioned element 228 causes opposing translation of first optical module 202 and second optical module 204. First optical module 202 and second optical module 204 may be translate along upper translation bar 238 and lower translation bar 240, which may be arranged parallel to each other and parallel to tensioned element 228. Upper translation bar 238 and lower translation bar 240 may additionally be coupled to interior frame 224. First optical module 202 may be coupled to upper translation bar 238 via first upper bar mount 242, and may be coupled to lower translation bar 240 via first lower bar mount 244. Similarly, second optical module 204 may be coupled to upper translation bar 238 via second upper bar mount 246, and may be coupled to lower translation bar 240 via second lower bar mount 248. Bar mounts 242, 244, 246, and 248 may be configured to translate along translation bars 238 and 240 with minimal friction.

First optical module 202 is coupled to tensioned element 228 via first adjustment system interface 250, while second optical module 204 is coupled to tensioned element 228 via second adjustment system interface 252. As shown in FIG. 2, first adjustment system interface 250 is coupled to upper bar mount 242 and second adjustment system interface 252 is coupled to upper bar mount 246. However, the adjustment system interfaces may be mounted elsewhere on first lens mount 212 and second lens mount 216. The position of the adjustment system interfaces may be translated relative to the center of the optical modules, and need not be symmetric.

As depicted, first adjustment system interface 250 is coupled to lower surface 236 of tensioned element 228, while second adjustment system interface 252 is coupled to upper surface 234 of tensioned element 228. In this way, movement of tensioned element 228 causes proportional, but opposing movement of first optical module 202 and second optical module 204 along upper translation bar 238 and lower translation bar 240. As an example, each of first optical module 202 and second optical module may be translatable by +/−6 mm on each side, but other dimensions may be used without departing from the scope of this disclosure.

First adjustment system interface 250 and second adjustment system interface 252 may be securely fastened to tensioned element 228. As shown, tensioned element 228 may be woven through numerous (e.g., 3) toothed mounts. These interfaces may adhere to a no-slip condition, although some slippage of tensioned element 228 at the pulleys may be tolerated. Tensioned element 228 may be fastened to the interfaces through riveting, bonding, screws, fasteners, staples, crimping, and/or any suitable fastener.

In some examples, first optical module 202 and second optical module 204 maybe indirectly coupled to tensioned element 228. For example, chassis constraints may not allow for a tensioned element to extend the length of the optical modules, or may force a belt placement that is not compatible with adjustment system interface placement. As such, an additional appendage may be used as a go-between to couple the tensioned element to the optical modules.

An external interface 254 may allow a user to actuate optical module adjustment system 206. As shown in FIG. 2, an external knob may be directly coupled to second pulley 232. Movement of second pulley 232 in a first direction (e.g., clockwise) may, via tension/pulling of the belt, cause first optical module 202 and second optical module 204 to translate further apart, while movement of second pulley 232 in a second direction, opposite the first direction (e.g., counterclockwise) may cause first optical module 202 and second optical module 204 to move closer together. External interface 254 may take the form of any suitable interface, such as a knob, slider, tab, etc. In some examples, one or more pulleys may be coupled to a digitally controller motor. External interface 254 may thus take the form of a push button or three-position switch. As long as there is a threshold amount of friction in optical module adjustment system 206, a user may only have to make a single adjustment. The next user would then adjust to suit their own needs. In some examples, a user may be able to store a preset position for first optical module 202 and second optical module 204, and then recall the preset upon use of the device.

Figure 3:
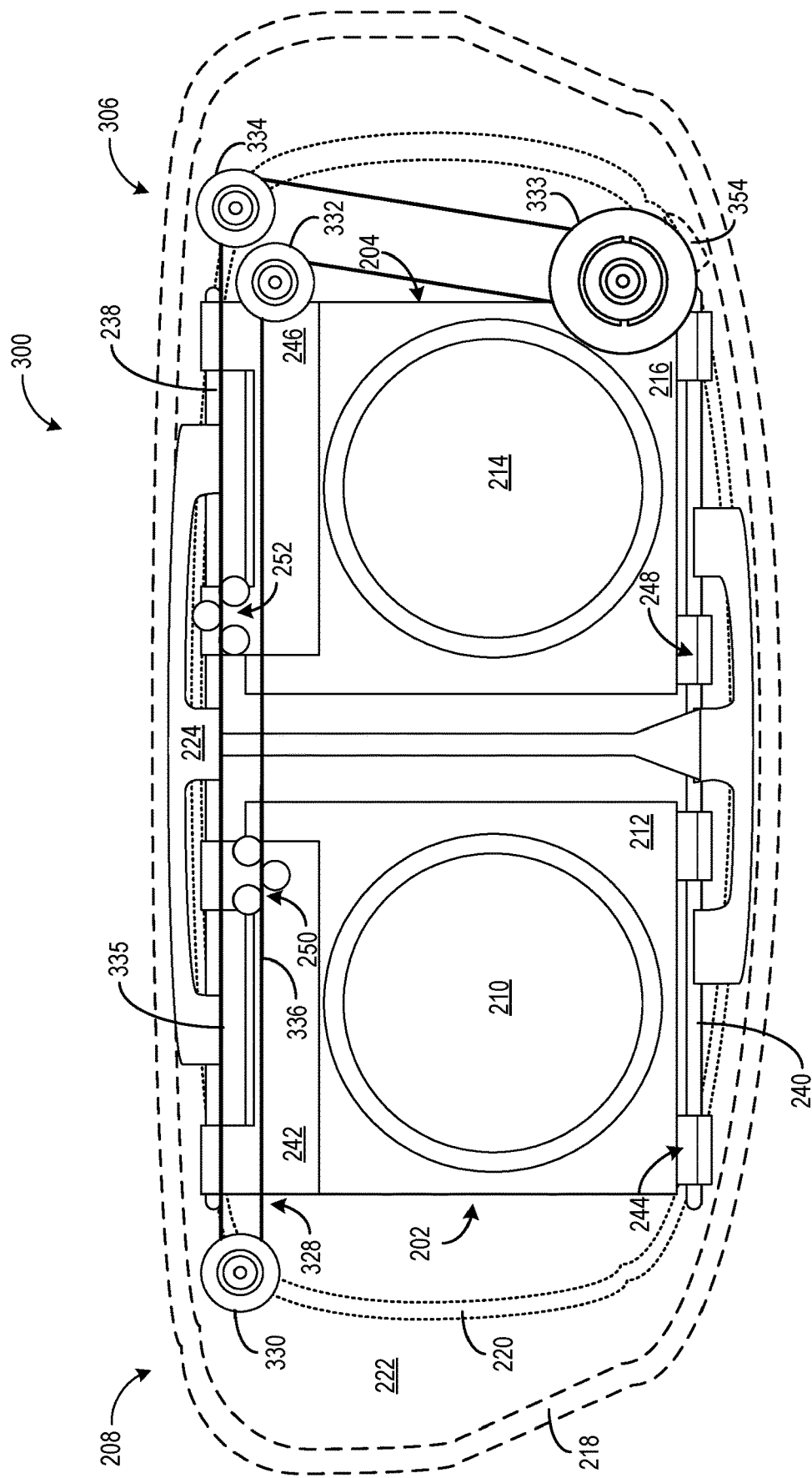

The use of a pulley system that does not add additional z-depth to the optical device allows for the placement of additional pulleys and/or tensioned elements to make better use of space within the optical device. FIG. 3 shows an example optical device 300 wherein an optical module adjustment system 306 includes additional pulleys, allowing for the external interface to be placed on a different plane from the adjustment system interfaces.

Optical module adjustment system 306 includes tensioned element 328. Tensioned element 328 wraps around first pulley 331, second pulley 332, third pulley 333, and fourth pulley 334. Upper surface 335 extends from fourth pulley 334 to first pulley 331. Lower surface 336 extends from first pulley 331 to second pulley 332. First pulley 331, second pulley 332, and fourth pulley 334 are arranged such that upper surface 335 and lower surface 336 extend in parallel for the length of first optical module 202 and second optical module 204, so as to direct anti-parallel movement of the modules.

Third pulley 333 is depicted near the base of optical device 300, but may be positioned wherever space constraints allow. In this example, external interface 354 is coupled to third pulley 333, enabling an interface position that is not parallel to the upper and lower surfaces of the tensioned element.

Figure 4:
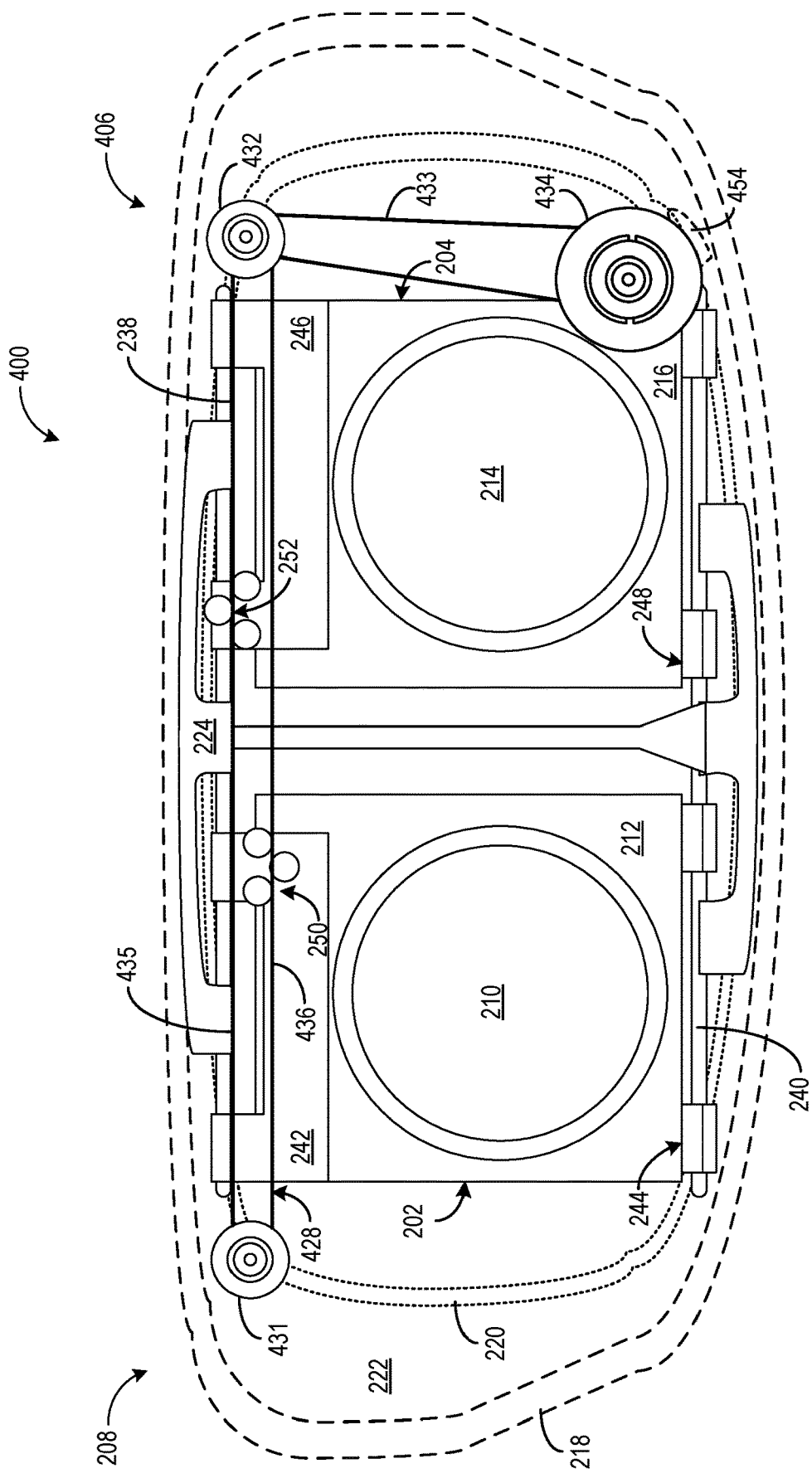

In some examples, multiple tensioned elements may be used. FIG. 4 shows an example optical device 400 wherein an optical module adjustment system 406 includes two tensioned elements. Primary tensioned element 428 extends around first pulley 431 and second pulley 432. Secondary tensioned element 433 extends around second pulley 432 and third pulley 434. Second pulley 432 may be configured with two or more rows of teeth, so that both tensioned elements may be accommodated. Upper surface 435 and lower surface 436 extend from second pulley 432 to first pulley 431 such that upper surface 435 and lower surface 436 extend in parallel for the length of first optical module 202 and second optical module 204, so as to direct anti-parallel movement of the modules. Similar to third pulley 333 of FIG. 3, third pulley 434 is depicted near the base of optical device 400 but may be positioned anywhere suitable. Third pulley 434 may be coupled to external interface 454. In this way, actuation of third pulley 434 via external interface 454 causes movement of secondary tensioned element 433, which in turn causes rotation of second pulley 432, thus driving translation of primary tensioned element 428.

Figure 5:
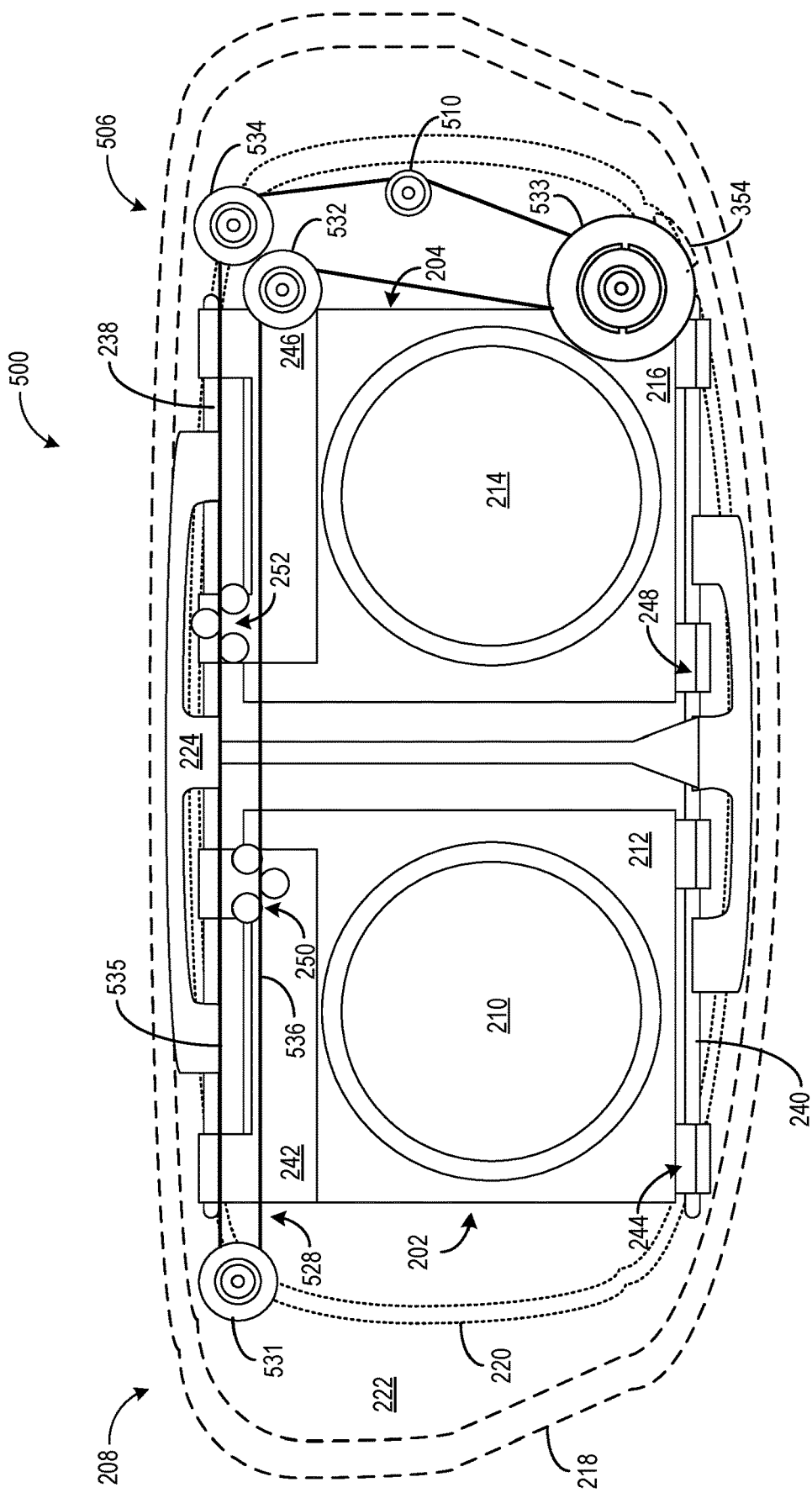

FIG. 5 shows an additional example of an optical device 500 having an optical module adjustment system 506 that includes a tensioning mechanism 510. Tensioned element 528 wraps around first pulley 531, second pulley 532, third pulley 533, tensioning mechanism 510, and fourth pulley 534. Upper surface 535 extends from fourth pulley 534 to first pulley 531. Lower surface 536 extends from first pulley 531 to second pulley 532.

Tensioning mechanism 510 may be a spring-loaded idler or pulley, a tension bar, or other device usable to passively remove any slack in tensioned element 528, akin to an engine accessory bracket idler pulley. Tensioning mechanism is depicted between third pulley 533 and fourth pulley 534, but may be located elsewhere, such as between second pulley 532 and third pulley 533.

Although depicted as part of an optical module adjustment system that includes four pulleys and one tensioned element, tensioning mechanism 510 may be incorporated into systems with more or fewer pulleys, multiple tensioned elements, etc. In some systems, multiple tensioned mechanisms may be included, provided upper surface 535 and lower surface 536 extend parallel to the desired direction of movement of the optical modules.

While FIGS. 2-5 depict optical adjustment systems where the adjustment system interfaces and tensioned element are located towards the top of the optical modules, in other examples, the adjustment system interfaces and tensioned element may be located towards the bottom of the optical modules.

Figure 6:
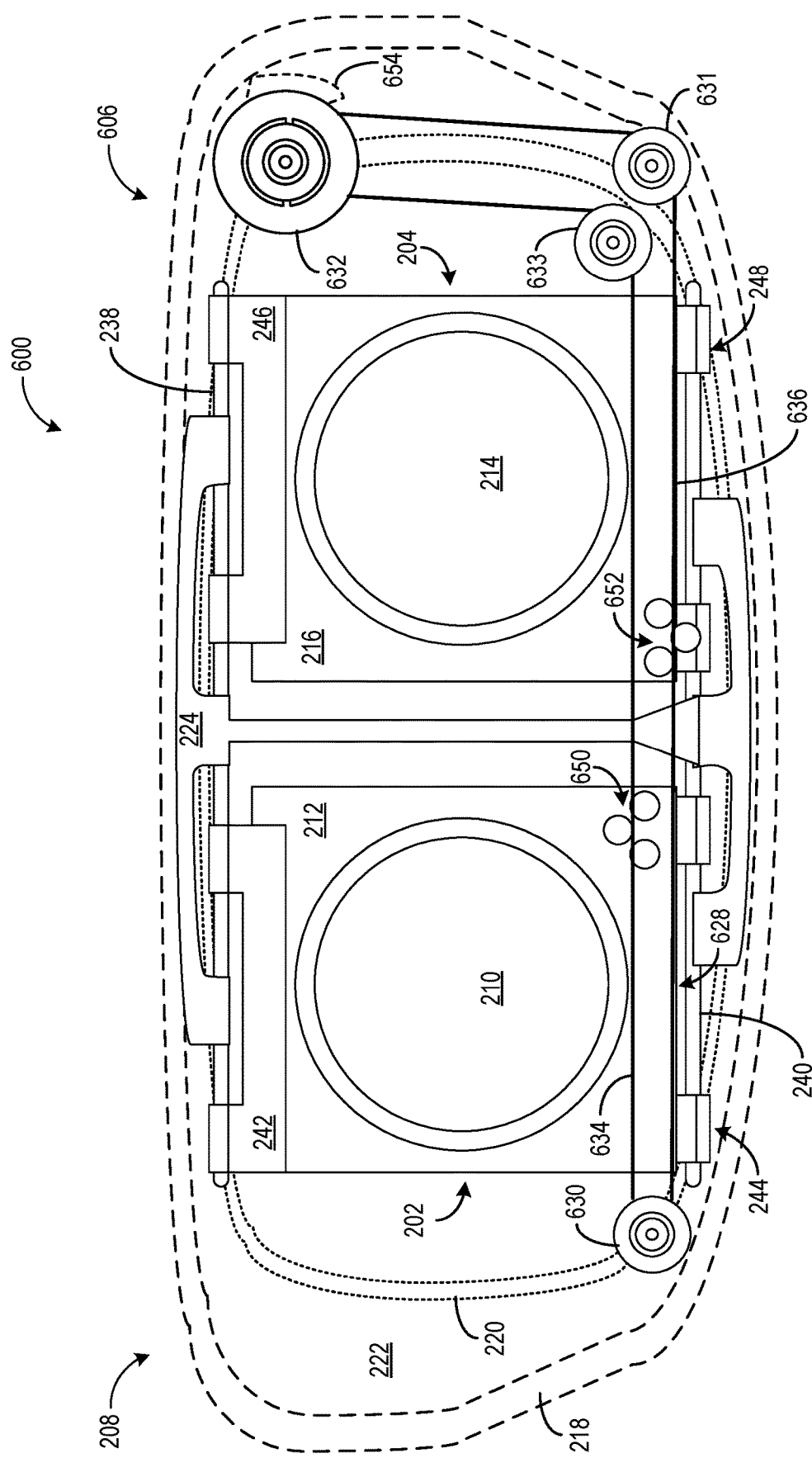

FIG. 6 depicts one such example of an optical device 600. Optical module adjustment system 606 includes tensioned element 628. Tensioned element 628 wraps around first pulley 630, second pulley 631, third pulley 632, and fourth pulley 633. Upper surface 634 extends from fourth pulley 633 to first pulley 630. Lower surface 636 extends from first pulley 630 to second pulley 631. First pulley 630, second pulley 631, and fourth pulley 633 are arranged towards the base of optical device 600. As such, first adjustment system interface 650 and second adjustment system interface 652 are arranged towards the bases of first optical module 202 and second optical module 204, near or coupled to first lower bar mount 244 and second lower bar mount 248, respectively. Third pulley 632 is depicted near the top of optical device 600, but may be positioned wherever space constraints allow. In this example, external interface 654 is coupled to third pulley 632.

Figure 7:
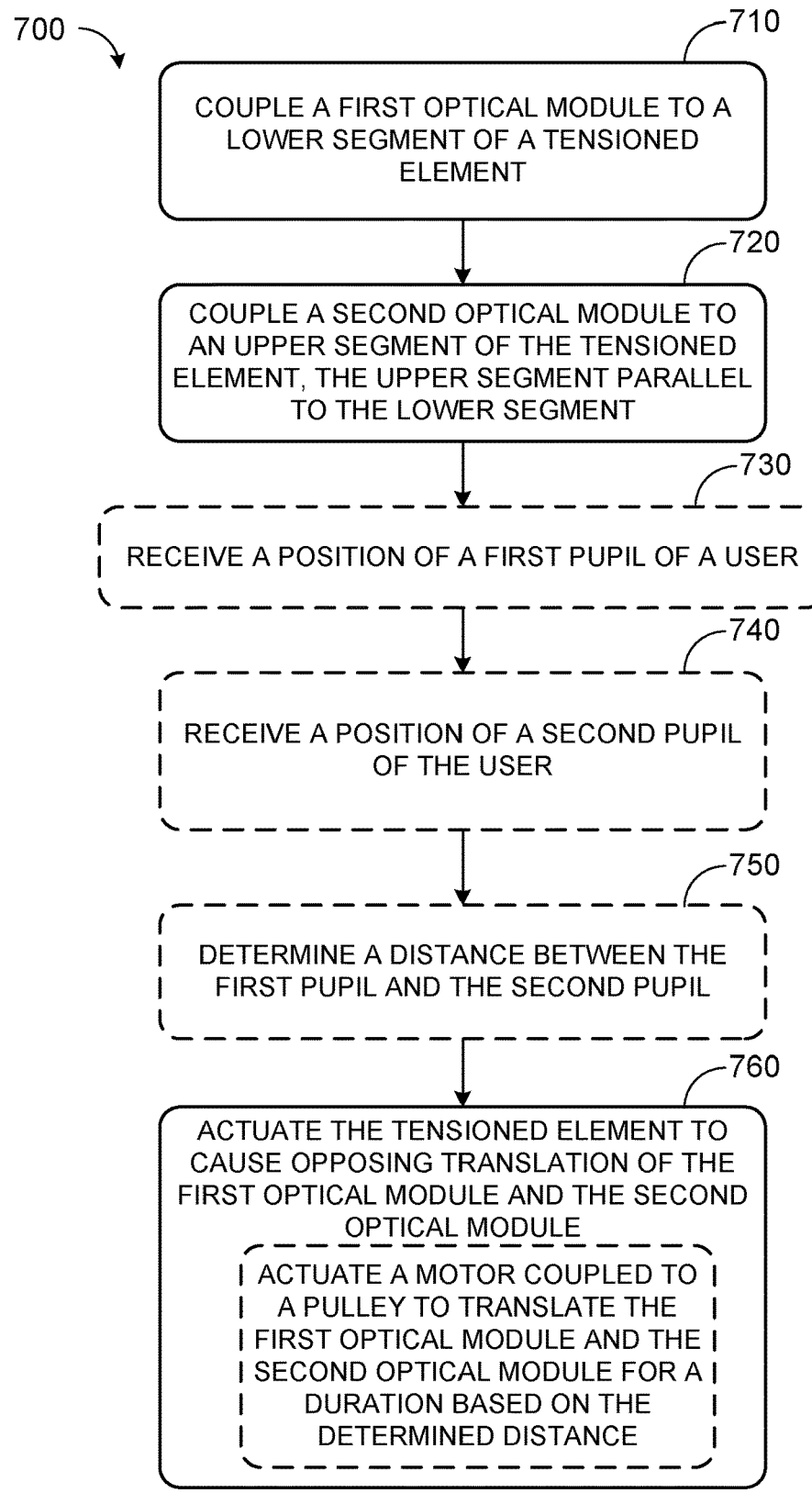
FIG. 7 shows an example method for adjusting the lateral width between optical modules in an optical system.

FIG. 7 shows an example method 700 for adjusting the lateral width between optical modules in an optical system. At 710, method 700 includes coupling a first optical module to a lower segment of a tensioned element. As described with regards to FIGS. 2-6, coupling a first optical module to a lower segment of a tensioned element may include coupling a first adjustment system interface to a tensioned element, such as a timing belt, so that the first adjustment system interface translates in accordance with movement of the lower segment, and thus the entire first optical module translates in accordance with movement of the lower segment.

At 720, method 700 includes coupling a second optical module to an upper segment of the tensioned element, the upper segment parallel to the lower segment. Coupling a second optical module to an upper segment of the tensioned element may include coupling a second adjustment system interface to the tensioned element, so that the second adjustment system interface translates in accordance with movement of the upper segment, and thus the entire second optical module translates in accordance with movement of the upper segment.

At 730, method 700 optionally includes receiving a position of a first pupil of a user. At 740, method 700 optionally includes receiving a position of a second pupil of the user. For example, one or more inward facing image sensors, such as inward facing image sensors 114A and 114B, as described with regard to FIG. 1 may be configured to acquire one or more images of the first and second pupil and further configured to determine gaze tracking information from a wearer's eyes including pupil size and position. At 750, method 700 optionally includes determining a distance between the first pupil and the second pupil. In other words, the method may include determining an inter-pupil distance based on images acquired by inward facing image sensors. In other examples, a user may acquire a static photograph of their eyes (e.g., using a cell phone camera). The photograph may be parsed using eye and/or gaze detection methods, and the positions of and distance between the user's pupils may then be determined.

At 760, method 700 includes actuating the tensioned element to cause opposing translation of the first optical module and the second optical module. As described with regard to FIGS. 2-6, opposing translation may be generated by a user interacting with an external interface coupled to a pulley. Such interaction may result in the first and second modules moving further apart or closer together. The external interface may actuate the tensioned element via manual movement of the tensioned element, via a motor, etc.

Optionally, in examples where an inter-pupil distance was determined and/or received, actuating the tensioned element to cause opposing translation of the first optical module and the second optical module may include actuating a motor coupled to a pulley in order to translate the first optical module and the second optical module for a duration based on the determined distance. For example, a controller may determine an inter-pupil distance for a user based on information determined through gaze detection. The controller may then determine optimal placement for the first and second optical modules based on the interpupil distance. Optimal placement may be determined relative to current placement. A distance needed to move the first and second optical modules from their current placement to their optimal placement may be determined, and a duration needed to operate the motor may be determined based on the needed distance.

In further examples, a user may signal a pre-set configuration based on a previously determined optimal placement. A controller may then operate the motor for a duration based on the current placement and the optimal placement of the first and second optical modules. In some examples, the optical device may identify the user and the user's pre-set configuration based on one or more user characteristics, such as retinal characteristics.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
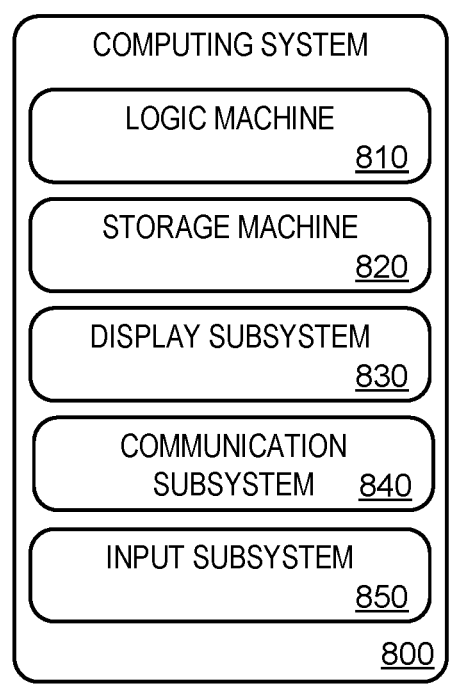
FIG. 8 schematically shows an example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 810 and a storage machine 820. Computing system 800 may optionally include a display subsystem 830, input subsystem 840, communication subsystem 850, and/or other components not shown in FIG. 8. Controller 108 may be considered to be an example of computing system 800.

Logic machine 810 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 820 includes one or more physical devices configured to hold instructions executable by the logic machine to implement the methods and processes described herein. When such methods and processes are implemented, the state of storage machine 820 may be transformed—e.g., to hold different data.

Storage machine 820 may include removable and/or built-in devices. Storage machine 820 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 820 may include volatile, nonvolatile, dynamic, static, read/write, read-only, random-access, sequential-access, location-addressable, file-addressable, and/or content-addressable devices.

It will be appreciated that storage machine 820 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 810 and storage machine 820 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 810 executing instructions held by storage machine 820. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 830 may be used to present a visual representation of data held by storage machine 820. This visual representation may take the form of a graphical user interface (GUI). As the herein described methods and processes change the data held by the storage machine, and thus transform the state of the storage machine, the state of display subsystem 830 may likewise be transformed to visually represent changes in the underlying data. Display subsystem 830 may include one or more display devices utilizing virtually any type of technology. Such display devices may be combined with logic machine 910 and/or storage machine 820 in a shared enclosure, or such display devices may be peripheral display devices. Display 104, including right and left eye optical modules 104R and 104L, as well as first and second optical modules 202 and 204 may be considered to be examples of display subsystem 830.

When included, input subsystem 840 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker (e.g., inward facing image sensors 114A and 114B), accelerometer, and/or gyroscope for motion detection and/or intent recognition; as well as electric-field sensing componentry for assessing brain activity.

When included, communication subsystem 850 may be configured to communicatively couple computing system 800 with one or more other computing devices. Communication subsystem 850 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

In one example, an optical system, comprises a first optical module; a second optical module; and a tensioned element including an upper segment attached to the first optical module and a lower segment attached to the second optical module, such that movement of the tensioned element generates opposing movement of the first and second optical modules, the first optical module moving in a direction parallel to a direction of movement of the upper segment, and the second optical module moving in a direction parallel to a direction of movement of the lower segment. In such an example, or any other example, the tensioned element may additionally or alternatively span the length of the first optical module and the second optical module. In any of the preceding examples, or any other example, the tensioned element may additionally or alternatively be wrapped around two or more pulleys such that the upper segment and the lower segment are parallel across the length of the first optical module and the second optical module. In any of the preceding examples, or any other example, one of the two or more pulleys may additionally or alternatively be coupled to an external interface. In any of the preceding examples, or any other example, actuation of the external interface in a first direction may additionally or alternatively move the first optical module and second optical module closer together, and actuation of the external interface in a second direction, opposite the first direction, may additionally or alternatively move the first optical module and second optical module further apart. In any of the preceding examples, or any other example, one or more pulleys may additionally or alternatively be positioned on a separate plane from either the upper segment or lower segment. In any of the preceding examples, or any other example, the external interface may additionally or alternatively be positioned on a separate plane from either the upper segment or lower segment. In any of the preceding examples, or any other example, the tensioned element may additionally or alternatively be further wrapped around a tensioning mechanism in addition to the two or more pulleys. In any of the preceding examples, or any other example, one of the two or more pulleys may additionally or alternatively be coupled to a motor. In any of the preceding examples, or any other example, the optical system may additionally or alternatively comprise a secondary tensioned element, and one of the two or more pulleys may additionally or alternatively interface with both the tensioned element and the secondary tensioned element. In any of the preceding examples, or any other example, the tensioned element may additionally or alternatively be a timing belt. In any of the preceding examples, or any other example, the first and second optical modules may additionally or alternatively translate along one or more translation bars that are positioned parallel to the upper segment and the lower segment.

In another example, a method for adjusting the lateral width between optical modules in an optical system comprises coupling a first optical module to a lower segment of a tensioned element; coupling a second optical module to an upper segment of the tensioned element, the upper segment parallel to the lower segment; and actuating the tensioned element to cause opposing translation of the first optical module and the second optical module. In such an example, or any other example, actuating the tensioned element may additionally or alternatively include adjusting the position of a pulley interfacing with the tensioned element. In any of the preceding examples, or any other example, actuating the tensioned element may additionally or alternatively include actuating an external mechanism coupled to the pulley interfacing with the tensioned element. In any of the preceding examples, or any other example, adjusting the position of the pulley interfacing with the tensioned element may additionally or alternatively include actuating a motor coupled to the pulley. In any of the preceding examples, or any other example, the method may additionally or alternatively comprise: receiving a position of a first pupil of a user; receiving a position of a second pupil of the user; determining a distance between the first pupil and the second pupil; actuating the motor coupled to the pulley to translate the first optical module and the second optical module for a duration based on the determined distance.

In yet another example, a head-mounted display system, comprises first and second optical modules; and an optical module adjustment system comprising: a tensioned element wrapped around two or more pulleys such that an upper segment and a lower segment of the tensioned element are parallel across the length of the first optical module and the second optical module; a first optical module mount coupled to the upper segment; a second optical module mount coupled to the lower segment; and a pulley actuator configured to generate movement of the tensioned element so that the first and second optical modules move in opposing directions parallel to a direction of movement of the tensioned element. In such an example, or any other example, the pulley actuator may additionally or alternatively be coupled to an external interface. In any of the preceding examples, or any other example, the pulley actuator may additionally or alternatively include a digitally controlled motor, and the system may additionally or alternatively comprise one or more inward facing image sensors; and a controller configured to: receive a position of a first pupil of a user; receive a position of a second pupil of the user; determine a distance between the first pupil and the second pupil; and actuate the pulley actuator to translate the first optical module and the second optical module for a duration based on the determined distance.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical system, comprising:
a first optical module;
a second optical module; and
a tensioned element including an upper segment attached to the first optical module via a first adjustment system interface that is physically engaged with the upper segment and fixed in position with regard to both the first optical module and the upper segment, and a lower segment attached to the second optical module via a second adjustment system interface that is physically engaged with the lower segment and fixed in position with regard to both the second optical module and the lower segment, such that movement of the tensioned element generates opposing movement of the first and second optical modules, the first optical module moving in a direction parallel to a direction of movement of the upper segment, and the second optical module moving in a direction parallel to a direction of movement of the lower segment.

2. The optical system of claim 1, wherein the tensioned element spans the length of the first optical module and the second optical module.

3. The optical system of claim 2, wherein the tensioned element is wrapped around two or more pulleys such that the upper segment and the lower segment are parallel across the length of the first optical module and the second optical module.

4. The optical system of claim 3, wherein one of the two or more pulleys is coupled to an external interface.

5. The optical system of claim 4, wherein one or more pulleys are positioned on a separate plane from either the upper segment or lower segment.

6. The optical system of claim 5, wherein the external interface is positioned on a separate plane from either the upper segment or lower segment.

7. The optical system of claim 3, wherein the tensioned element is further wrapped around a tensioning mechanism in addition to the two or more pulleys.

8. The optical system of claim 3, wherein one of the two or more pulleys is coupled to a motor.

9. The optical system of claim 3, further comprising a secondary tensioned element, and wherein one of the two or more pulleys interfaces with both the tensioned element and the secondary tensioned element.

10. The optical system of claim 1, wherein the first and second optical modules translate along one or more translation bars that are positioned parallel to the upper segment and the lower segment.

11. The optical system of claim 1, wherein the first adjustment system interface is securely fastened to the upper segment, and wherein the second adjustment system interface is securely fastened to the lower segment.

12. The optical system of claim 1, wherein the tensioned element is a timing belt, wherein the first and second adjustment system interfaces each comprise two or more toothed mounts, and wherein the tensioned element is woven through toothed mounts of the first and second adjustment system interfaces.

13. A method for adjusting the lateral width between optical modules in an optical system, comprising:
coupling a first optical module to a lower segment of a tensioned element via a first adjustment system interface that is physically engaged with the lower segment and fixed in position with regard to both the first optical module and the lower segment;
coupling a second optical module to an upper segment of the tensioned element via a second adjustment system interface that is physically engaged with the upper segment, the upper segment parallel to the lower segment and fixed in position with regard to both the second optical module and the upper segment; and
actuating the tensioned element to cause opposing translation of the first optical module and the second optical module.

14. The method of claim 13, wherein actuating the tensioned element includes adjusting the position of a pulley interfacing with the tensioned element.

15. The method of claim 14, wherein actuating the tensioned element includes actuating an external mechanism coupled to the pulley interfacing with the tensioned element.

16. The method of claim 14, wherein adjusting the position of the pulley interfacing with the tensioned element includes actuating a motor coupled to the pulley.

17. The method of claim 16, further comprising:
receiving a position of a first pupil of a user;
receiving a position of a second pupil of the user;
determining a distance between the first pupil and the second pupil;
actuating the motor coupled to the pulley to translate the first optical module and the second optical module for a duration based on the determined distance.

18. A head-mounted display system, comprising:
first and second optical modules; and
an optical module adjustment system comprising:
a tensioned element wrapped around two or more pulleys such that an upper segment and a lower segment of the tensioned element are parallel across the length of the first optical module and the second optical module;
a first optical module mount coupled to the upper segment via a first adjustment system interface that is physically engaged with the upper segment and fixed in position with regard to both the first optical module and the upper segment;
a second optical module mount coupled to the lower segment via a second adjustment system interface that is physically engaged with the lower segment and fixed in position with regard to both the second optical module and the lower segment; and
a pulley actuator configured to generate movement of the tensioned element so that the first and second optical modules move in opposing directions parallel to a direction of movement of the tensioned element.

19. The head-mounted display system of claim 18, wherein the pulley actuator is coupled to an external interface.

20. The head-mounted display system of claim 18, wherein the pulley actuator includes a digitally controlled motor, and where the system further comprises:
one or more inward facing image sensors; and
a controller configured to:
receive a position of a first pupil of a user;
receive a position of a second pupil of the user;
determine a distance between the first pupil and the second pupil; and
actuate the pulley actuator to translate the first optical module and the second optical module for a duration based on the determined distance.

* * * * *